US009226520B2

(12) United States Patent
Mantius et al.

(10) Patent No.: US 9,226,520 B2
(45) Date of Patent: *Jan. 5, 2016

(54) PROCESS FOR PRODUCING A PROANTHOCYANIDIN EXTRACT

(71) Applicant: Ocean Spray Cranberries, Inc., Lakeville-Middleboro, MA (US)

(72) Inventors: Harold L. Mantius, North Kingstown, RI (US); Lawrence E. Rose, North Dighton, MA (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,675

(22) Filed: Apr. 3, 2015

(65) Prior Publication Data
US 2015/0208700 A1 Jul. 30, 2015

Related U.S. Application Data

(63) Continuation of application No. 12/168,308, filed on Jul. 7, 2008, now Pat. No. 9,023,413.

(60) Provisional application No. 60/949,604, filed on Jul. 13, 2007.

(51) Int. Cl.
*A23L 1/212* (2006.01)
*A23L 1/30* (2006.01)
(Continued)

(52) U.S. Cl.
CPC .............. *A23L 1/212* (2013.01); *A23L 1/3002* (2013.01); *A23L 2/087* (2013.01); *A23L 2/74* (2013.01); *A23V 2002/00* (2013.01)

(58) Field of Classification Search
CPC ........... A23V 2300/34; A23V 2300/38; A23V 2250/21166; A23V 2200/02; A23V 2250/21; B01D 61/142; B01D 61/145; B01D 61/022; B01D 61/025; B01D 61/147; A23L 2/02; A23L 2/74; A23L 2/06; A23L 2/087; A23L 1/3002; A23L 2/04; A23C 9/1422; A23C 2210/206
USPC .............. 426/425, 490, 599, 478, 330.5, 431, 426/655; 424/725
See application file for complete search history.

(56) References Cited

U.S. PATENT DOCUMENTS

| 3,799,806 | A | 3/1974 | Madsen |
| 4,834,998 | A | 5/1989 | Shrikhande |

(Continued)

FOREIGN PATENT DOCUMENTS

| EP | 1676572 | 7/2006 |
| JP | S63-267774 | 11/1988 |

(Continued)

OTHER PUBLICATIONS

Zeman, Leos J., Microfiltration and ultrafiltration: principles and applications, Marcel Dekker, Inc. 1996, pp. 529.*

(Continued)

*Primary Examiner* — Lien Tran
*Assistant Examiner* — Hong T Yoo
(74) *Attorney, Agent, or Firm* — Fish & Richardson P.C.

(57) ABSTRACT

A method for producing a proanthocyanidin extract is described. The method comprises: (a) providing a volume of proanthocyanidin-containing liquid feedstock; (b) passing the proanthocyanidin-containing liquid feedstock to an ultrafiltration feed tank; (c) filtering the material in the ultrafiltration feed tank through an ultrafiltration membrane system to fractionate the material into a proanthocyanidin-reduced permeate stream and a proanthocyanidin-enriched retentate stream; (d) collecting the proanthocyanidin-reduced permeate stream; and (e) passing the proanthocyanidin-enriched retentate stream to the ultrafiltration feed tank until the volume of proanthocyanidin-containing liquid feedstock is exhausted and thereafter collecting the proanthocyanidin-enriched retentate stream.

25 Claims, 1 Drawing Sheet

(51) Int. Cl.
*A23L 2/08* (2006.01)
*A23L 2/74* (2006.01)

(56) References Cited

U.S. PATENT DOCUMENTS

| | | |
|---|---|---|
| 5,252,350 A | 10/1993 | Hartmann |
| 5,484,594 A | 1/1996 | Frangi et al. |
| 5,912,363 A | 6/1999 | Nafisi-Movaghar et al. |
| 5,968,517 A | 10/1999 | Duncan et al. |
| 6,733,813 B2 | 5/2004 | Mantius et al. |
| 7,022,368 B2 | 4/2006 | Mantius et al. |
| 2002/0197380 A1 | 12/2002 | Mantius et al. |
| 2005/0010040 A1 | 1/2005 | Gourdin et al. |
| 2006/0177560 A1 | 8/2006 | Mantius et al. |

FOREIGN PATENT DOCUMENTS

| | | |
|---|---|---|
| JP | H02-48593 | 2/1990 |
| JP | 2001-64172 | 3/2001 |
| JP | 2001-278792 | 10/2001 |
| JP | 2006-282612 | 10/2006 |
| WO | 2005/030200 | 4/2005 |
| WO | 2006/115123 | 11/2006 |

OTHER PUBLICATIONS

Australian Office Action; Application No. 2008276266; mailed Dec. 3, 2012; Applicant: Ocean Spray Cranberries, Inc.; 3 pages.
Chinese Office Action; Application No. 200880024498.8; issued Jan. 18, 2012 (5 pages).
Chinese Office Action; Application No. 200880024498.8; mailed May 22, 2013 (with English translation—9 pages).
English translation of Abstract JP02006282612, pp. 1-2 (Oct. 2006).
Forberg, Cheryl, "Stop the Clock! Cooking," Penguin Putnum Inc., pp. 23 (2003).
International Preliminary Report on Patentability, PCT/US2008/069294, issued Jan. 19, 2010, 2 pages.
International Search Report and Written Opinion, PCT/US08/69294; mailed Sep. 30, 2008 (14 pages).
Notice of Reasons for Rejection issued in PCT/US2008/069294 for Japanese Patent Application No. 2010-516172 on Apr. 17, 2013 (English translation only—4 pages).
Office Action issued by the State Intellectual Property Office; China Application No. 200880024498.8; mailed Oct. 25, 2012, 9 pages (with English language translation).
Office Action issued in Canadian Application No. 2,692,688 on Aug. 2, 2013 (2 pages).
Shahidi, Fereidoon, "Natural Antioxidants: Chemistry, Health Effects and Applications," AOCS Press, pp. 154 (1997).
Smith, P.G., Introduction to Food Process Engineering, pp. 419 (2003).
Supplementary European Search Report issued in EP08781419 on Jun. 2, 2014 (7 pages).

* cited by examiner

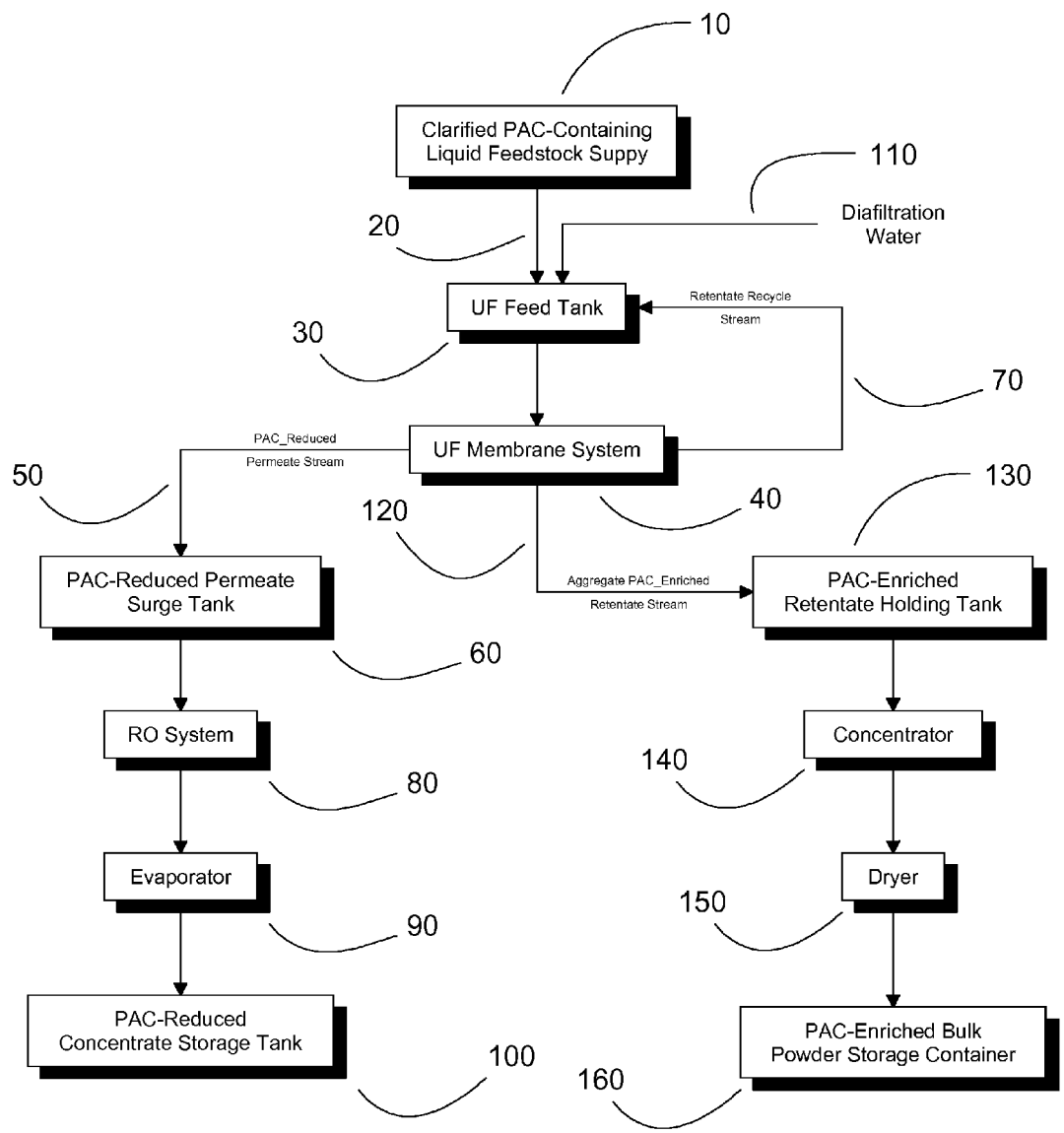

PROCESS FOR PRODUCING A PROANTHOCYANIDIN EXTRACT

RELATED APPLICATION INFORMATION

This application is a continuation of U.S. application Ser. No. 12/168,308, filed Jul. 7, 2008, now U.S. Pat. No. 9,023,413 B2 which claims priority to U.S. provisional application Ser. No. 60/949,604, filed Jul. 13, 2007.

BACKGROUND

Certain fruits, particularly cranberries, contain a class of compounds known as proanthocyanidins (also called condensed tannins or procyanidins), which impart unique health benefits. The selective capture and dry weight concentration of proanthocyanidin compounds {PACs} may thus open up novel opportunities in the field of product application {e.g., retail beverages, lozenges, etc.} relative to delivering those unique benefits.

SUMMARY

A method is described which uses an Ultrafiltration (UF) membrane system to fractionate a PAC-containing liquid feedstock {e.g., cranberry juice] into a PAC-reduced permeate stream and PAC-enriched retentate stream. In effect, when the nominal molecular weight cut-off of the membrane system is properly selected, a substantial fraction of the higher molecular weight PACs (and/or relatively high molecular weight aggregates of PACs) present are selectively retained in the retentate, with the remaining array of constituent lower molecular weight soluble solids {e.g., sugars, acids, anthocyanins, etc.} preferentially passing through the membrane as permeate. A simple mechanism has thus been discovered for selectively concentrating PACs in a liquid stream on a dry weight basis. In fact, using this method, extracts can be manufactured to virtually any preset, specified PAC dry weight content {e.g., at 5%, 10%, 15%, 20%, 30%, 40%, 50%, 60%, 70%, 80%, 90%, and 98%}. Moreover, the selective fractionation of PACs based on molecular weight, with the lower molecular weight fraction passing through the membrane as permeate, and the higher molecular weight fraction retained as retentate, may also result in an extract of enhanced bioactivity per unit weight of PACs. Furthermore, the method described herein can also be used to provide a clarified PAC extract potentially well suited for use in retail beverage formulations {e.g., low calorie isotonic beverages}, due to a substantial removal of bitter lower molecular weight non-PAC phenolic compounds into the PAC-reduced permeate stream.

A PAC-enriched fruit or vegetable extract can be used for a variety of purposes. For example, because PACs are believed to confer health benefits, an extract having a high dry weight concentration of PACs can be combined with water, juices or other beverages to provide a beverage with enhanced health benefits. An extract having a high dry weight concentration of PACs can be dried and combined with other ingredients to provide a pill or capsule that is useful as a dietary supplement. A PAC-enriched fruit or vegetable extract can also be used to enhance the health benefits of various foods. For example, such an extract could be applied to dried fruits, for example dried cranberries, to create a dried fruit with enhanced health benefits.

Thus, described herein is a method comprising: (a) providing a volume of proanthocyanidin-containing liquid feedstock; (b) passing the proanthocyanidin-containing liquid feedstock to an ultrafiltration feed tank; (c) filtering the material in the ultrafiltration feed tank through an ultrafiltration membrane system to fractionate the material into a proanthocyanidin-reduced permeate stream and a proanthocyanidin-enriched retentate stream; (d) collecting the proanthocyanidin-reduced permeate stream; and (e) passing the proanthocyanidin-enriched retentate stream to the ultrafiltration feed tank until the volume of proanthocyanidin-containing liquid feedstock is exhausted and thereafter collecting the proanthocyanidin-enriched retentate stream.

In various embodiments: the proanthocyanidin-containing liquid feedstock is a fruit juice or a fruit juice fraction; the fruit juice or fruit juice fraction is substantially free of insoluble fruit solids; the fruit juice or fruit juice fraction is cranberry juice or a cranberry juice fraction; the method further comprises concentrating the proanthocyanidin-reduced permeate stream to create a concentrated proanthocyanidin-reduced permeate; the proanthocyanidin-reduced permeate stream is concentrated by reverse osmosis; the proanthocyanidin-reduced permeate stream is concentrated by evaporation; the proanthocyanidin-reduced permeate stream is concentrated by reverse osmosis and evaporation; the method further comprises concentrating the collected proanthocyanidin-enriched retentate stream to create a concentrated proanthocyanidin-enriched retentate; the proanthocyanidin-enriched retentate stream is concentrated by reverse osmosis; the proanthocyanidin-enriched retentate stream is concentrated by evaporation; the proanthocyanidin-enriched retentate stream is concentrated by reverse osmosis and evaporation; the concentrated proanthocyanidin-enriched retentate is dried to create a proanthocyanidin-containing powder; the method further comprises processing at least a portion of the proanthocyanidin-reduced permeate to create a first fraction that is relatively enriched in anthocyanins and/or phenolics and relatively reduced in sugars and acids and a second fraction that is relatively enriched in sugars and acids and relatively reduced in anthocyanins and/or phenolics; the further processing comprises passing at least a portion of the proanthocyanidin-reduced permeate through resin column; and the further processing comprises passing at least a portion of the proanthocyanidin-reduced permeate through a membrane.

The details of one or more embodiments of the invention are set forth in the accompanying drawings and the description below. Other features, objects, and advantages of the invention will be apparent from the description and drawings, and from the claims.

DESCRIPTION OF DRAWING

The FIGURE is a flow chart depicting one embodiment of the invention.

DETAILED DESCRIPTION

Referring to the FIGURE, a flow diagram is shown of one embodiment of a UF membrane system modified batch process for preparing a PAC-enriched fruit or vegetable extract. The process begins with a clarified {<5 NTU} PAC-containing liquid feedstock {e.g., 2 Brix cranberry juice}. In the embodiment of the FIGURE, the clarified PAC-containing liquid feedstock 20 from a clarified PAC-containing liquid feedstock supply 10 is fed to a UF feed tank 30. The clarified PAC-containing liquid feedstock in the UF feed tank is then pumped to a UF membrane system 40 {using a Koch Membrane Systems model #3838K328-NYT spiral wound UF membrane with a 5000 mol. wt. cutoff}, with the PAC-reduced permeate stream 50 transferred to a PAC-reduced permeate surge tank 60, and the PAC-enriched retentate stream 70 recycled to the UF feed tank. The PAC-reduced permeate is then pumped to a reverse osmosis (RO) system 80 {using a Koch Membrane Systems model # TFC3838HRN1 spiral wound RO membrane} for semi-concentration {e.g., to 18 Brix}, an evaporator 90 for final concentration {e.g., to 50 Brix}, and finally to a PAC-reduced concentrate storage tank 100. The continuous processing of the clarified PAC-containing liquid feedstock supply thus results in a continuous accumulation of PACs in the liquid contents of UF feed tank and UF membrane system {the aggregate PAC-enriched retentate stream}.

Upon exhaustion of the clarified PAC-containing liquid feedstock supply, the aggregate PAC-enriched retentate stream can then be diafiltered with water 110 to further increase the PAC dry weight content of the liquid extract through the systematic removal of residual lower molecular weight soluble solids {e.g., sugars, acids, etc.} as permeate. The aggregate PAC-enriched liquid retentate 120 {with a PAC dry wt. content of at least 5%, 10%, 15%, 20%, 30%, 40%, 50%, 60%, 70%, 80%, or 90%} is collected in a PAC-enriched retentate holding tank 130, and sequentially pumped to a concentrator 140 then a dryer 150. The resultant product constituting a PAC-enriched extract powder is finally transferred to a PAC-enriched bulk powder storage container 160.

A suitable ultrafilter for use in the methods of the invention can have a molecular weight cutoff of about 2,000-10,000 Dalton, about 3,000 Dalton, about 4000 Dalton, about 5000 Dalton, about 6000 Dalton, about 7000 Dalton, about 8000 Dalton, or about 9000 Dalton on propylene glycol.

In some cases it may be desirable to process the material in the PAC-enriched retentate holding tank to separate undissolved solids. These undissolved solids can include higher molecular weight PACs and/or aggregates of lower molecule weight PACs. These undissolved solids can be separated from liquid in which they are suspended by centrifugation using, for example, a decanter centrifuge or a disk centrifuge.

In some cases it may be desirable to further process the PAC-reduced permeate by utilizing resin technology (e.g., employing AMBERLITE® XAD7HP or AMBERLITE® TM FPX66 resin) to selectively remove and recover anthocyanins and/or phenolic compounds as another phytochemically distinct extract fraction(s). In some cases it may be desirable to further process the PAC-reduced permeate by utilizing resin technology to selectively remove and recover anthocyanins and/or phenolic compounds as another phytochemically distinct extract fraction(s). This fraction can be combined with a fraction that is relatively high in PACs, e.g., the PAC-enriched retentate, to obtain material that is high in PACs, anthocyanins and/or phenolic compounds and relatively low in sugars and acids.

The foregoing is a description of one embodiment of the method of the invention. Those skilled in the art will be able to modify the process. For example, the system may be operated in batch, modified batch or feed and bleed mode under variable temperature, pressure and flow conditions. Furthermore, the system may contain membranes in configurations other than spiral wound (i.e., tubular or hollow fiber), of varying polymer composition (for example PTFE, PVDF, etc.) or inorganic membrane structures with varied composition (for example ceramic, carbon, or stainless steel etc.) and support media. Additionally, membranes other than ultrafiltration membranes may be employed such as reverse osmosis or nanofiltration membranes or charged membranes or charge-specific membranes may be employed in any manner previously described. Moreover, controlled atmosphere (e.g., $N_2$ or $CO_2$) techniques can be used to minimize the deleterious effects of oxidative reactions. Different diafiltration media (e.g., acidified water) can also be employed to stabilize and/or adjust the color of the final extract.

Fruit juice produced by countercurrent extraction of cranberries can be used in the methods of the invention as follows. Countercurrently extracted fruit juice can be prepared as described in U.S. Pat. Nos. 5,320,861 and 5,419,251, hereby incorporated by reference. Briefly, frozen whole raw cranberries are provided to a cleaning stage to remove debris such as twigs, leaves, etc. and then conveyed to a sorting stage which sorts fruit to a selected size. The size-selected fruit is then conveyed to a slicing stage that slices the berries to expose the inner flesh of the fruit, unprotected by the skin. The whole cranberries are preferably cut to provide slices between 6 to 8 millimeters in width. The cleaned, sized and sliced frozen cranberries are then defrosted using hot water (e.g., at about 130° F.) to a temperature of less than 75° F. (e.g., 65° F.) and conveyed to the solid input of an extractor stage which employs a countercurrent extractor described in detail in U.S. Pat. No. 5,320,861. The liquid input to the extractor is typically derived from a fruit-derived water supply. The liquid output of the extractor stage is a high-quality extract mixture of fruit-derived water and fruit juice, which is collected for further treatment and use in the methods of the invention. In addition, the extracted fruit can be used as a fruit feed stock to produce additional juice that can be used in the methods of the invention.

A number of embodiments of the invention have been described. Nevertheless, it will be understood that various modifications may be made without departing from the spirit and scope of the invention.

What is claimed is:

1. A method comprising:
    (a) providing a volume of proanthocyanidin-containing liquid feedstock;
    (b) passing the volume of proanthocyanidin-containing liquid feedstock to an ultrafiltration feed tank;
    (c) filtering a portion of the volume of liquid feedstock in the ultrafiltration feed tank through an ultrafiltration membrane system to fractionate the liquid feedstock into a proanthocyanidin-reduced permeate stream and a proanthocyanidin-enriched retentate stream;
    (d) collecting the proanthocyanidin-reduced permeate stream;
    (e) recycling the proanthocyanidin-enriched retentate stream to the ultrafiltration feed tank, to thereby form a mixture of proanthocyanidin-containing liquid feedstock and proanthocyanidin-enriched retentate stream;
    (f) repeating steps (c), (d), and (e), until the volume of proanthocyanidin-containing liquid feedstock is exhausted, to thereby provide a proanthocyanidin-enriched retentate; and
    (g) diafiltering the proanthocyanidin-enriched retentate to thereby further concentrate proanthocyanidins in the proanthocyanidin-enriched retentate.

2. The method of claim 1, wherein the diafiltering is performed with water or acidified water.

3. The method of claim 1, wherein the ultrafiltration membrane system comprises propylene glycol.

4. The method of claim 1, wherein the ultrafiltration membrane system comprises a molecular weight cutoff of about 2,000-10,000 Daltons.

5. The method of claim 1, wherein the ultrafiltration membrane system comprises a molecular weight cutoff of about 3,000 Daltons.

6. The method of claim 1, wherein the ultrafiltration membrane system comprises a molecular weight cutoff of about 4,000 Daltons.

7. The method of claim 1, wherein the ultrafiltration membrane system comprises a molecular weight cutoff of about 5,000 Daltons.

8. The method of claim 1, wherein the ultrafiltration membrane system comprises a molecular weight cutoff of about 6,000 Daltons.

9. The method of claim 1, wherein the ultrafiltration membrane system comprises a molecular weight cutoff of about 7,000 Daltons.

10. The method of claim 1, wherein the ultrafiltration membrane system comprises a molecular weight cutoff of about 8,000 Daltons.

11. The method of claim 1, wherein the ultrafiltration membrane system comprises a molecular weight cutoff of about 9,000 Daltons.

12. The method of claim 1, wherein the proanthocyanidin-containing liquid feedstock is a fruit juice or a fruit juice fraction.

13. The method of claim 12, wherein the fruit juice or the fruit juice fraction is cranberry juice or a cranberry juice fraction.

14. The method of claim 1, further comprising concentrating the proanthocyanidin-reduced permeate stream to create a concentrated proanthocyanidin-reduced permeate.

15. The method of claim 14, wherein the proanthocyanidin-reduced permeate stream is concentrated by reverse osmosis.

16. The method of claim 14, wherein the proanthocyanidin-reduced permeate stream is concentrated by evaporation.

17. The method of claim 14, wherein the proanthocyanidin-reduced permeate stream is concentrated by reverse osmosis and evaporation.

18. The method of claim 1, further comprising concentrating the collected proanthocyanidin-enriched retentate stream to create a concentrated proanthocyanidin-enriched retentate.

19. The method of claim 18, wherein the proanthocyanidin-enriched retentate stream is concentrated by reverse osmosis.

20. The method of claim 18 wherein the proanthocyanidin-enriched retentate stream is concentrated by evaporation.

21. The method of claim 18, wherein the proanthocyanidin-enriched retentate stream is concentrated by reverse osmosis and evaporation.

22. The method of claim 18, wherein the concentrated proanthocyanidin-enriched retentate is dried to create a proanthocyanidin-containing powder.

23. The method of claim 1, further comprising processing at least a portion of the proanthocyanidin-reduced permeate to create a first fraction and a second fraction, wherein the first fraction is relatively enriched in anthocyanins and/or phenolics and relatively reduced in sugars and acids in comparison to the second fraction.

24. The method of claim 23, wherein the processing comprises passing at least a portion of the proanthocyanidin-reduced permeate through a resin column.

25. The method of claim 23, wherein the processing comprises passing at least a portion of the proanthocyanidin-reduced permeate through a membrane.

* * * * *